US008413127B2

(12) United States Patent
Archambault et al.

(10) Patent No.: US 8,413,127 B2
(45) Date of Patent: *Apr. 2, 2013

(54) FINE-GRAINED SOFTWARE-DIRECTED DATA PREFETCHING USING INTEGRATED HIGH-LEVEL AND LOW-LEVEL CODE ANALYSIS OPTIMIZATIONS

(75) Inventors: Roch G. Archambault, Markham (CA); Robert J. Blainey, Newmarket (CA); Yaoqing Gao, North York (CA); Allan R. Martin, Toronto (CA); James L. McInnes, Toronto (CA); Francis Patrick O'Connell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 611 days.

This patent is subject to a terminal disclaimer.

(21) Appl. No.: 12/644,756

(22) Filed: Dec. 22, 2009

(65) Prior Publication Data

US 2010/0095271 A1 Apr. 15, 2010

Related U.S. Application Data

(63) Continuation of application No. 10/926,595, filed on Aug. 26, 2004, now Pat. No. 7,669,194.

(51) Int. Cl.
*G06F 9/44* (2006.01)
*G06F 9/45* (2006.01)
*G06F 9/30* (2006.01)

(52) U.S. Cl. ........ 717/158; 717/130; 717/150; 717/160; 717/161; 712/205; 712/207

(58) Field of Classification Search .................... None
See application file for complete search history.

(56) References Cited

U.S. PATENT DOCUMENTS

| 6,249,845 | B1 | 6/2001 | Nunez et al. | |
|---|---|---|---|---|
| 6,301,641 | B1 | 10/2001 | Verhoeven et al. | |
| 6,453,389 | B1 | 9/2002 | Weinberger et al. | |
| 6,571,318 | B1 | 5/2003 | Sander et al. | |
| 6,820,250 | B2 | 11/2004 | Muthukumar et al. | |
| 7,168,070 | B2 * | 1/2007 | Archambault et al. | 717/151 |
| 2003/0005419 | A1 * | 1/2003 | Pieper et al. | 717/141 |
| 2003/0079089 | A1 | 4/2003 | Barrick et al. | |
| 2003/0225996 | A1 | 12/2003 | Thompson | |
| 2004/0154019 | A1 | 8/2004 | Aamodt et al. | |
| 2005/0223175 | A1 * | 10/2005 | Hepner et al. | 711/137 |
| 2006/0059311 | A1 * | 3/2006 | Van De Waerdt et al. | 711/137 |

* cited by examiner

*Primary Examiner* — Isaac Tecklu
(74) *Attorney, Agent, or Firm* — Yee & Associates, P.C.; Yeen Tham

(57) ABSTRACT

A mechanism for minimizing effective memory latency without unnecessary cost through fine-grained software-directed data prefetching using integrated high-level and low-level code analysis and optimizations is provided. The mechanism identifies and classifies streams, identifies data that is most likely to incur a cache miss, exploits effective hardware prefetching to determine the proper number of streams to be prefetched, exploits effective data prefetching on different types of streams in order to eliminate redundant prefetching and avoid cache pollution, and uses high-level transformations with integrated lower level cost analysis in the instruction scheduler to schedule prefetch instructions effectively.

20 Claims, 3 Drawing Sheets

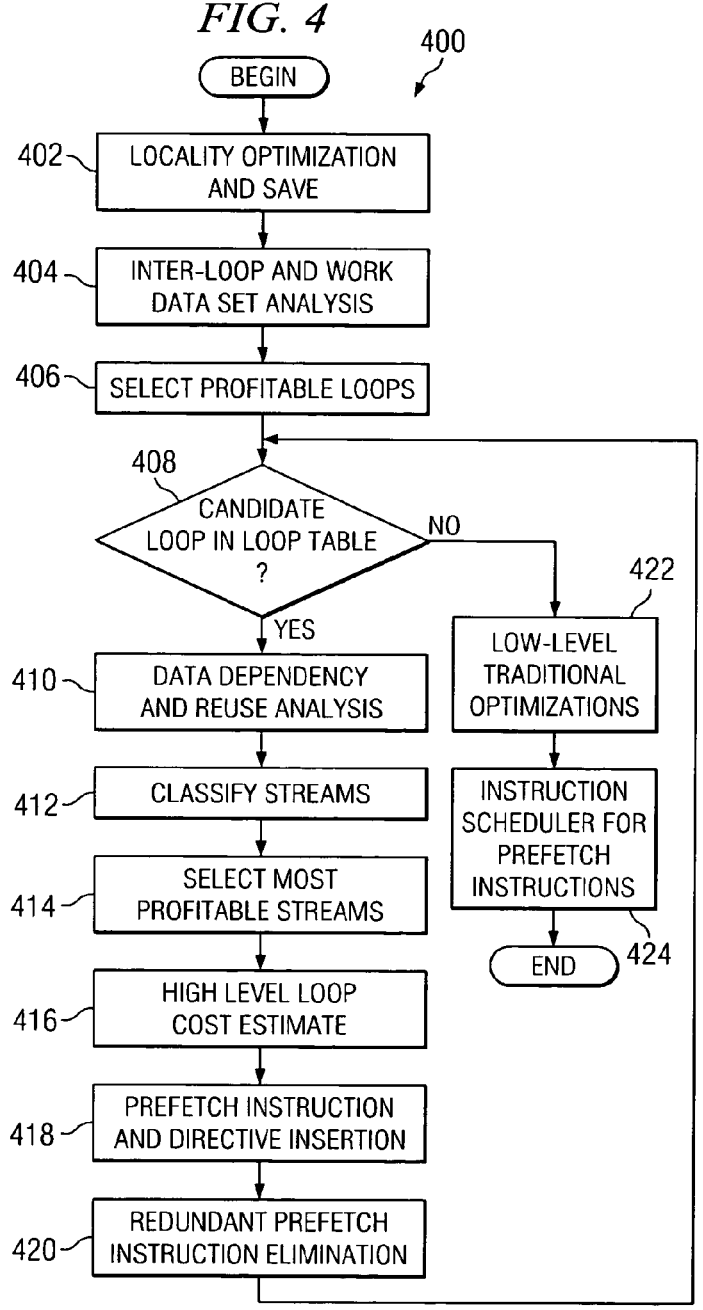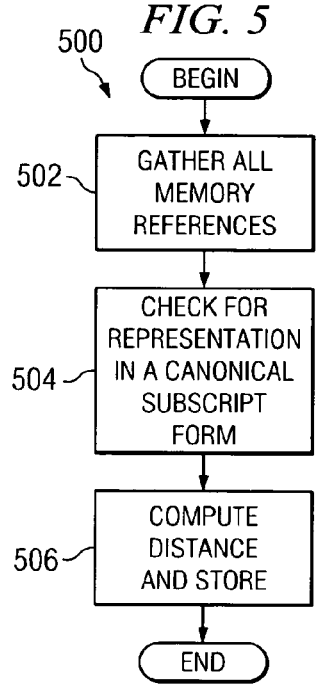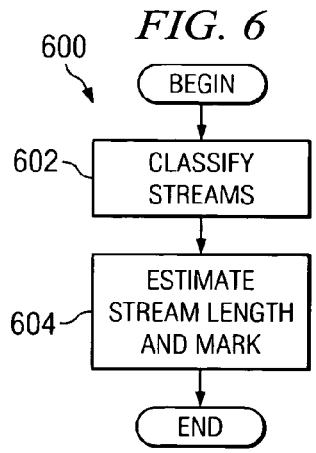

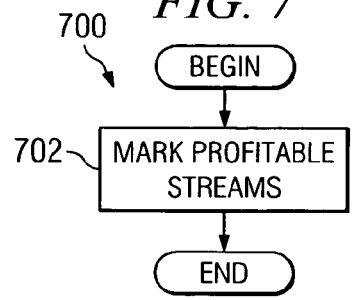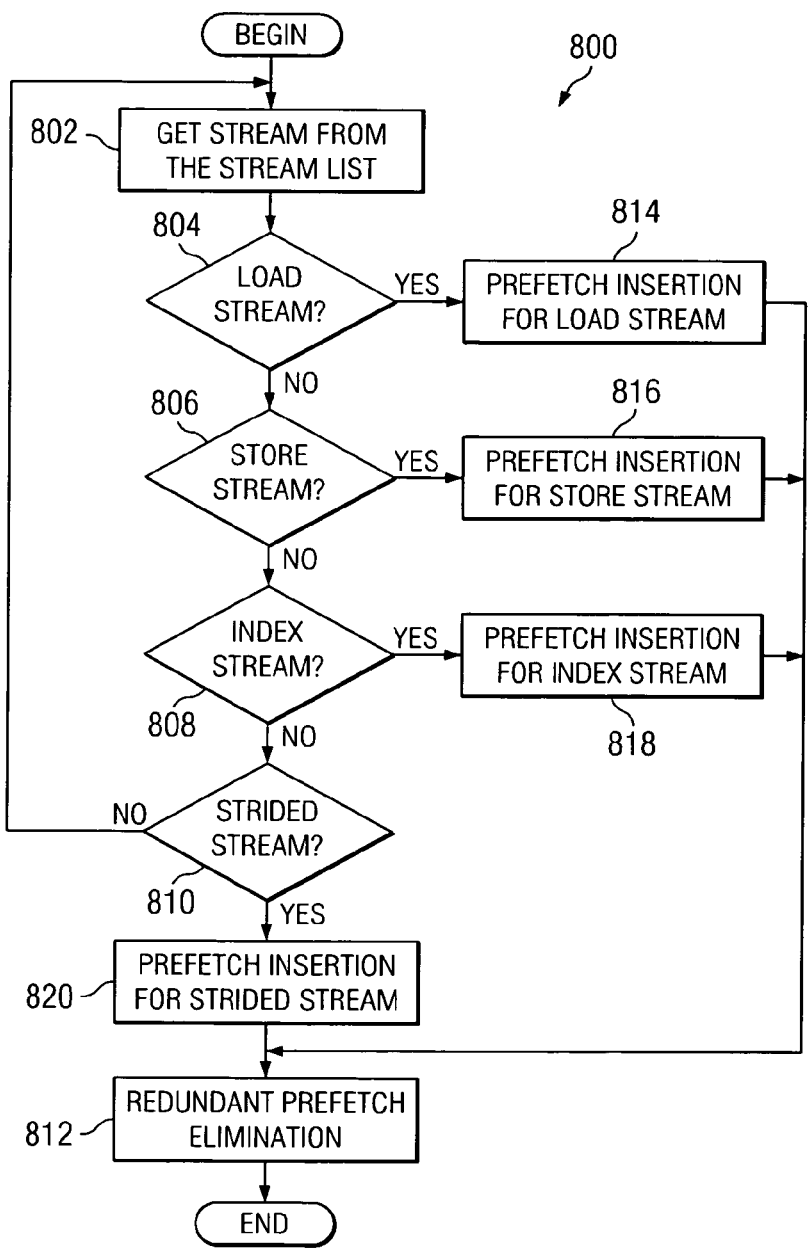

FINE-GRAINED SOFTWARE-DIRECTED DATA PREFETCHING USING INTEGRATED HIGH-LEVEL AND LOW-LEVEL CODE ANALYSIS OPTIMIZATIONS

This application is a continuation of pending application Ser. No. 10/926,595, filed Aug. 26, 2004, status allowed.

BACKGROUND OF THE INVENTION

1. Technical Field

The present invention relates to a method of minimizing effective memory latency without unnecessary cost. In particular, the present invention relates to fine-grained software directed data prefetching using integrated high-level, and low-level code analysis and optimizations.

2. Description of Related Art

In conventional computing systems, prefetching is a well known technique for effectively tolerating memory access latency which can adversely affect the performance of applications on modern processors. Rather than waiting for a cache miss to initiate a memory fetch, data prefetching anticipates such misses and issues a fetch to the memory system in advance of the actual memory reference. Much of the recent work in the area of prefetching has focused on three dimensions of prefetching effectiveness, which are timeliness, accuracy and overhead. Timeliness is the placement of the prefetches such that the latency to memory is effectively hidden. Accuracy is prefetching data which will actually be used by the program before it is used and reducing prefetches which will not be used and merely pollutes the caches. Overhead involves incurring the least amount of overhead resources incurred by the prefetch instructions themselves.

Data prefetching can be accomplished by software alone, hardware alone or a combination of the two. Software prefetching relies on compile-time analysis to insert and schedule prefetch, or touch, instructions within user programs. But prefetch instructions themselves involve some overhead. Hardware-based prefetching employs special hardware which monitors the storage reference patterns of the application in an attempt to infer prefetching opportunities. It has no instruction overhead, but it is often less accurate than software prefetching because it speculates on future memory accesses without the benefit of compile-time information. The combination of software and hardware prefetching is designed to take advantage of compile-time program information so as to direct the hardware prefetcher while incurring the least amount of software overhead as possible.

The IBM Power4 and Power5 systems have storage hierarchies consisting of three levels of cache and the memory subsystem: on-chip L1 and L2 cache and off-chip L3 cache. They employ hardware data prefetching to identify and automatically prefetch streams without any assistance from software. Still, there are shortcomings associated with hardware prefetching, such as, hardware prefetching does not begin immediately, as it takes several cache misses before a stream is identified. Additionally, hardware supports a limited number of streams to prefetch, if there are more concurrent streams than supported by hardware, a replacement algorithm is employed, and hardware may not prefetch the most profitable streams. Furthermore, hardware may prefetch more data than necessary since it does not know a priori where the end of the stream is.

SUMMARY OF THE INVENTION

The present invention provides a mechanism for minimizing effective memory latency without unnecessary cost through fine-grained software-directed data prefetching using integrated high-level and low-level code analysis and optimizations. The mechanism identifies and classifies streams based on reuse analysis and dependence analysis. The mechanism makes use of the information from high-level loop transformations, data remapping, and work data-set analysis to identify which data is most likely to incur a cache miss. The mechanism exploits effective hardware prefetching through high-level loop transformations, including locality and reuse analysis, to determine the proper number of streams. The mechanism exploits effective data prefetching on different types of streams, based on compiler static analysis and dynamic profiling information, in order to eliminate redundant prefetching and avoid cache pollution. The mechanism uses high-level transformations with integrated lower level cost analysis in the instruction scheduler to schedule prefetch instructions effectively.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a high-level flow diagram illustrating the operation of data prefetching in accordance with a preferred embodiment of the present invention;

FIG. 5 is a flow diagram illustrating the operation of the stream identification process in accordance with a preferred embodiment of the present invention;

FIG. 6 is a flow diagram illustrating the operation of the stream classification process in accordance with a preferred embodiment of the present invention;

FIG. 7 is a flow diagram illustrating the operation of the stream selection process in accordance with a preferred embodiment of the present invention; and FIG. 8 is a flow diagram illustrating the operation of the prefetching and directive insertion in accordance with a preferred embodiment of the present invention.

DETAILED DESCRIPTION OF THE PREFERRED EMBODIMENT

Figure 1:
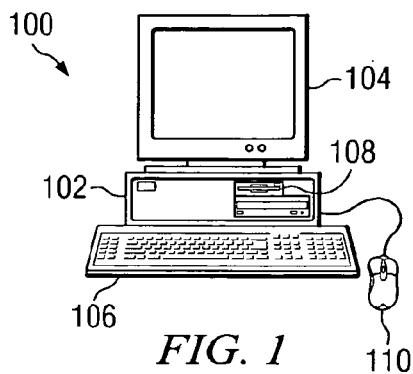
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer™ computer or IntelliStation® computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
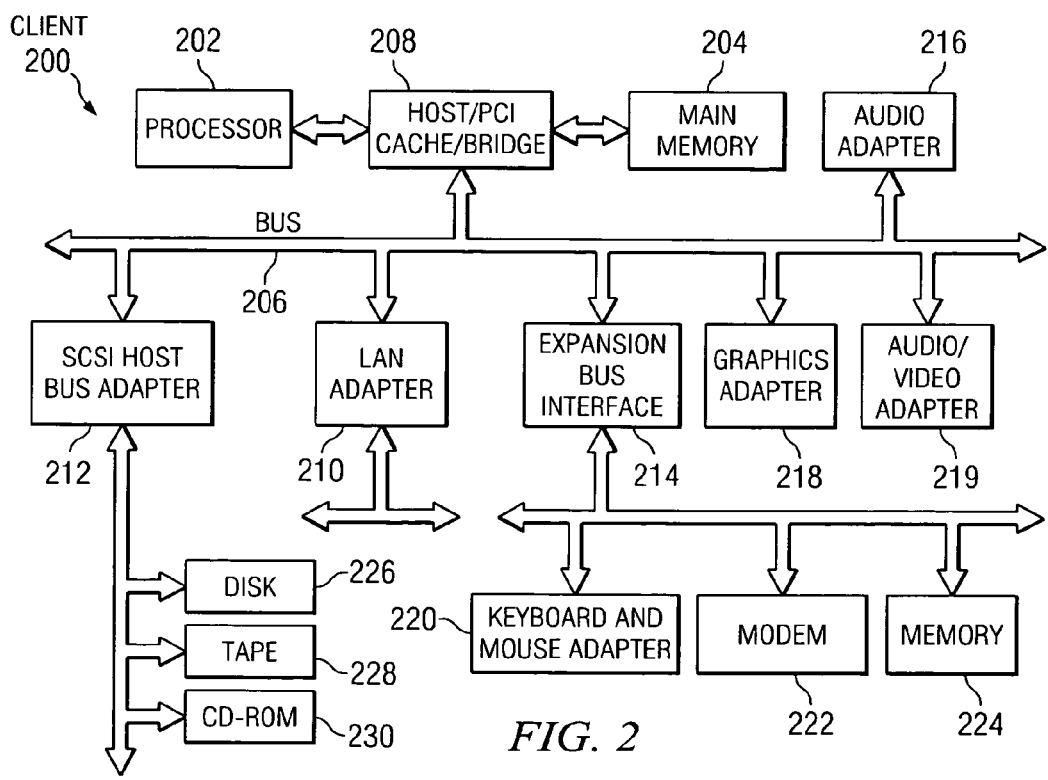
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a mechanism for minimizing effective memory latency without unnecessary cost through fine-grained software-directed data prefetching using integrated high-level and low-level code analysis and optimizations. The mechanism identifies and classifies streams based on reuse analysis and dependence analysis. The mechanism makes use of the information from high-level loop transformations, data remapping, and work data-set analysis to identify which data is most likely to incur a cache miss. The mechanism exploits effective hardware prefetching through high-level loop transformations, including locality and reuse analysis, to determine the proper number of streams. The mechanism exploits effective data prefetching on different types of streams, based on compiler static analysis and dynamic profiling information, in order to eliminate redundant prefetching and avoid cache pollution. The mechanism uses high-level transformations with integrated lower level cost analysis in the instruction scheduler to schedule prefetch instructions effectively.

Figure 3:
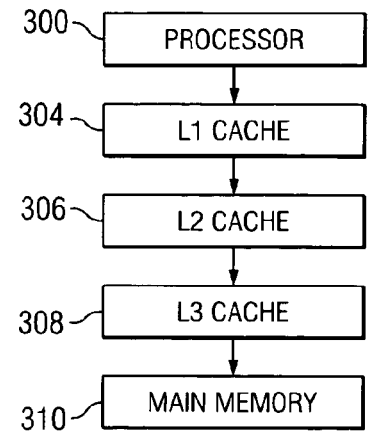
FIG. 3 is a diagram illustrating an exemplary implementation of components in accordance with the present invention.

Turning now to FIG. 3, a diagram illustrating an exemplary implementation of components 202, 204 and 208 in FIG. 2 is depicted in accordance with the present invention. As shown in FIG. 3, in this illustrative example, processor 202 and main memory 204 in FIG. 2 may be implemented as processor 300 and main memory 310 in FIG. 3. However, PCI bridge 208 in FIG. 2 may include two or more levels of cache memory. In this example, level 1 cache 304, level 2 cache 306 and level 3 cache 308 are depicted. Level 1 cache 304 may be a fast memory chip that includes a small memory size, such as 64 kilobytes for instance. Generally, level 1 cache 304 is sometimes referred to as a "primary cache." This cache is located between the processor, such as processor 300, and level 2 cache 306. Depending on the implementation, level 1 cache 304 may be integrated on the same integrated circuit as processor 300. Level 1 cache 304 also is more expensive compared to level 2 cache 306, because of its faster access speed.

Level 2 cache 306, a secondary cache, is sometimes larger and slower than level 1 cache 304. Level 2 cache 306 is generally located between the level 1 cache 304 and main memory 310. When cache misses occur in level 1 cache 306, processor 300 may attempt to retrieve data from level 2 cache 306 prior to searching for the data in main memory 310. Unlike level 1 cache 304, level 2 cache 306 is often located external to the integrated circuit of processor 300 although, depending on the implementation, level 2 cache 306 may be integrated on the same integrated circuit as processor 300. Level 2 cache 306 may also be cheaper to produce compared to level 1 cache 304, because of its slower access speed. In addition to level 1 and level 2 caches, other levels may also be added to PCI bridge 208 in FIG. 2, for example, level 3 cache 308, which may be even larger in size than level 2 cache 306 and may be slower access time.

Turning now to FIG. 4, a high-level flow diagram 400 illustrating the operation of data prefetching is depicted in accordance with a preferred embodiment of the present invention. First, high-level loop transformation and data remapping is performed for locality optimization (block 402). Locality optimization may either be spatial or temporal. Spatial locality means if a memory location is accessed, then most likely a location near this location will be accessed in the near future. Temporal locality means if a memory location is accessed, then most likely that it will be accessed again in the near future. Various types of high-level loop transformations may be utilized in performing the locality optimization, such as loop fusion, loop uni-modular transformation, loop distribution, outer and inner loop unrolling, loop tiling, and temporal vector optimization, though other types of high-level loop transformations may be utilized.

The information related to each loop is recorded in a loop table with an entry corresponding to each loop. Next, inter-loop analysis and work data-set analysis is performed to identify data access relationships between loops and estimate the data set size for each loop nest (block 404). Loop selection is performed to select profitable loops to produce a candidate loop list (block 406). In this step, a profitable loop is selected based on static and dynamic profile information. That is, the loops executed most frequently and the loops with large data set sizes, where it is most likely that cache misses may happen are selected. The candidate loop list is checked at then to see if there are candidate loops within the list (block 408), and if there is a loop in the candidate loop list, a loop is selected from the candidate loop list for processing.

All memory references in the loop are then gathered, and data dependency analysis and reuse analysis are used to identify unique streams within the loop (block 410). Stream classification is then performed classifying the stream types into load streams, store streams, indexed streams, and strided streams, though more or fewer types of streams may be used depending on implementation (block 412). As the streams are identified into stream types, they are loaded into a stream table. Based on static and dynamic profile information, the streams are classified as finite or infinite streams. A selection of the most profitable streams is performed and those most profitable streams are marked as protected until the number of protected streams reaches the number of streams supported by hardware. The most profitable streams are identified based on high-level loop transformation guided information such as temporal vector optimization and loop tiling, work data-set analysis to find the earliest point in a program that the stream may be prefetched, and off-line learning by gathering the runtime hardware performance counters (block 414).

A high-level loop cost estimate is performed to calculate loop body cost and to estimate how far data should be prefetched (block 416). Prefetch instruction insertion and annotation is then performed (block 418). In this step, proper prefetch control instructions are inserted at an optimal location based on stream types. Also directives are inserted by high-level optimizations which provide a guide to low-level optimizations for later adjustments. Finally, redundancy elimination is performed (block 420). In this step, based on high-level global analysis, redundant prefetch instructions can be eliminated if existing data is most likely already in cache.

From block 420, the process returns to block 408. The candidate loop list is checked to see if there are still candidate loops within the list (block 408). If so, the process starts again with block 410, otherwise the process proceeds to block 422. Low-level traditional optimizations are performed on the streams (block 422). Low-level optimizations that may be utilized are commoning, value numbering, and reassociation, though other types of low-level optimizations may be used depending on the implementation. Finally an instruction scheduler adjusts prefetch instruction based on high-level inserted directives and low-level precise loop cost calculation (block 424). This allows for prefetch instructions to be moved sufficiently far in advance of the use of their data through software pipelining and instruction scheduling and, when sufficient software pipelining is not possible, the prefetch address is adjusted to fetch cache lines sufficiently far in advance.

Turning now to FIG. 5, a flow diagram 500 illustrating the method of the stream identification process of block 410 in FIG. 4 is depicted in accordance with a preferred embodiment of the present invention. A stream is a sequence of addresses which depend on the inner loop induction variable with a constant stride that is less than L1 data cache line size. The loop identified at block 408 in FIG. 4 has all the memory references of the identified loop gathered into a loop reference list (block 502). For each memory reference in the loop reference list, a check is performed to see if the memory reference is a stream reference and may be represented in a canonical subscript form (block 504). A distance is then computed between the memory references and all of the unique streams are gathered into a streams list, based upon data dependency and reuse analysis (block 506). Reuse analysis attempts to discover those instances of array accesses that refer to the same memory line. Data dependency is the relation on the statements of the program.

Turning now to FIG. 6, a flow diagram 600 illustrating the method of the stream classification process of block 412 in FIG. 4 is depicted in accordance with a preferred embodiment of the present invention. Based on memory access patterns, each of the streams identified in the stream identification process and stored in the stream list are classified into stream types (block 602). Those stream type classifications include load streams, store streams, indexed streams, regular strided streams, and irregular strided streams, though more or fewer streams classifications may be used depending on implementation. A stream is a load stream if it includes at least one load (e.g., b and c in Example 1), otherwise it is a store stream (e.g., a in Example 1).

--- double a[N], b[N], C[N];
for (i=0; i<N; i++) {
   a[i] = b[i]*c[i];
}

---

Example 1

Load/Store Stream

A stream is called an indexed stream if it is accessed indirectly through another load stream (e.g., b in Example 2).

```
int a[N];
double b[N];
for (i=01 1<N; 1++) {
    ...= ... b[ a[i] + 8 ];
}
```

Example 2

Indexed Stream

A stream is called a strided stream if its stride is either unknown or a constant larger than L1 data cache line size. Based on static analysis and dynamic profile information, the stream length is estimated and streams are marked with limited or unlimited length (block 604). As the streams are identified into stream types, they are loaded into a stream table.

Turning now to FIG. 7, a flow diagram 700 illustrating the method of the stream selection process of block 414 in FIG. 4 is depicted in accordance with a preferred embodiment of the present invention. The most profitable streams are marked as protected until the number of protected streams reaches the number of hardware protected streams (block 702), based upon the high-level transformations, static analysis information and dynamic profile information gathered in blocks 402, 404, 406, 410, and 412 in FIG. 4.

Turning now to FIG. 8, a flow diagram 800 illustrating the method of the prefetching and directive insertion of block 418 in FIG. 4 is depicted in accordance with a preferred embodiment of the present invention. A stream is obtained from the stream list and checked for stream type (block 802). A determination is made as to whether the stream type is a load stream (block 804). If so, the process continues to block 814. At block 814, load stream prefetching is performed. When a number of streams in a loop is less than that supported by hardware, prefetch instructions are placed in the loop pre-head for all identified streams to reduce hardware startup time and all the streams are marked as protected to avoid performance degradation from unexpected address conflicts. Furthermore, to prevent cache pollution, steams are marked as limited or unlimited based on their lengths.

In Example 3, if the length of a stream is less than 1024 cache lines, the stream is marked as protected limited length stream.

```
___protected_stream_set(FORWARD, a, 1);
___protected_steam_count(N/16, 1);
___protected_stream_set(FORWARD, b, 2);
___protected_stream_count(N/16, 2);
___eieio( );
___protected_stream_go( );
for (i=0; i<N; i++) {
    c[i] = c[i] + a[i] * b[i]
}
```

Example 3

Length of a Stream Less than 1024 Cache Lines

In Example 4, if the length of a stream is equal to or larger than 1024 cache lines, the stream is marked as protected unlimited stream.

```
___protected_unlimited_stream_set_go(FORWARD, a, 1);
___protected_unlimited_stream_set_go(FORWARD, b, 2);
for (i=0; i<N; i++) {
    c[i] = c[i] + a[i] * b[i]
}
___protected_stream_stop_all( )
```

Example 4

Length of a Stream Equal to or Larger than 1024 Cache Lines

In Example 5, two short streams can be promoted into a single stream and the leading stream is marked as protected unlimited length stream if the two continuously allocated streams are in the continuous separate loops.

```
struct stream_t {
    double a[N];
    double b[N];
} p;
___protected_unlimited_stream_set_go(FORWARD, a, 1);
for (i=0; i<N; i++) {
    ...= ... p.a[i];
}
for (i=0; i<N; i++) {
    ...= ...p.b[i];
}
___protected_stream_stop_all( );
```

Example 5

Two Short Streams can be Promoted into a Single Stream

In Example 6, in spec2000fp/mgrid, there is a loop in routine resid( ) depicted. The compiler analysis identifies ten load streams in the loop. Furthermore, some of the streams are continuous over next iterations and thus no stream stop instruction is inserted so that prefetch will continue over iterations.

```
        DO 600 I3=2,N-1
        DO 600 I2=2,N-1
        DO 600 I1=2,N-1
600  R(I1,I2,I3)=V(I1,I2,I3)
    >       -A(0)*(U(I1,I2,I3))
    >       -A(1)*(U(I1-1,I2,I3)+U(I1+1,I2,I3)
    >         + U(I1,I2-1,I3)+U(I1,I2+1,I3)
    >         + U(I1,I2,I3-1)+U(I1,I2,I3+1))
    >       -A(2)*(U(I1-1,I2-1,I3)+U(I1+1,I2-1,I3)
    >         + U(I1-1,I2+1,I3)+U(I1+1,I2+1,I3)
    >         + U(I1,I2-1,I3-1)+U(I1,I2+1,I3-1)
    >         + U(I1,I2-1,I3+1)+U(I1,I2+1,I3+1)
    >         + U(I1-1,I2,I3-1)+U(I1-1,I2,I3+1)
    >         + U(I1+1,I2,I3-1)+U(I1+1,I2,I3+1))
    >       -A(3)*(U(I1-1,I2-1,I3-1)+U(I1+1,I2-1,I3-1)
    >         + U(I1-1,I2+1,I3-1)+U(I1+1,I2+1,I3-1)
    >         + U(I1-1,I2-1,I3+1)+U(I1+1,I2-1,I3+1)
    >         + U(I1-1,I2+1,I3+1)+U(I1+1,I2+1,I3+1))
     C
```

Example 6

Multiple Load Strings

In most cases, loop distribution will try to split a loop with a number of streams greater than that supported by hardware, as shown in Example 7. But in the case of a loop with more than 8 streams supported by hardware, two ways to do effective data prefetching are exploited. One is to unroll or strip mine the inner loop so that one cache line is loaded for each stream and a cache line prefetch is inserted ahead in the loop body, which allows software pipelining and instruction scheduling to move the prefetch instruction sufficiently far in advance. The other is to unroll the inner loop by some factor, and initiate 8 protected streams prefetching in the loop prehead. For the rest of streams, a cache line touch or do pseudo data prefetching is used by directing the software pipeliner and instruction scheduler to pre-load data from the next cache line into a register. This is illustrated in Example 7 as represented by the temporary variable:

```
double b[N], temp;
for (i=0; i<N/m; i++) {
    temp = b[i+ m-1] /* load from the next cache line
    */
        ... = b[i];
        ... = b[i+1];
        ...
        ... = b[i-m-2];
}
```

Example 7

More Streams than Supported by Hardware

When the load prefetching is complete for the stream, the process moves to block 812. In this step, a redundant prefetch elimination process is performed in order to eliminate redundant prefetches based on the information gathered during blocks 402, 404, 406, 410, 412, 414 and 416 in FIG. 4.

Returning to block 804, if the stream type is not a load stream, the process moves to block 806. A determination is made as to whether the stream type is a store stream (block 806). If so, the process continues to block 816. Store stream prefetching is performed (block 816). When the store prefetching is complete for the stream, the process moves to block 812. A redundant prefetch elimination process is performed in order to eliminate redundant prefetches based on the information gathered during blocks 402, 404, 406, 410, 412, 414 and 416 in FIG. 4.

Returning to block 806, if the stream type is not a store stream the process moves to block 808. A determination is made as to whether the stream type is an indexed stream (block 808). If so, the process continues to block 818. An indexed stream prefetching is performed (block 818). Indexed stream prefetching initiates after an indexed stream b[a[i]] is identified. At this point, a cache line touch is inserted in the loop body to execute a prefetch ahead of time, based on the total cycles in the loop body and L1 cache miss penalty. To be more precise, the high level optimizer actually inserts a pseudo cache line touch, and lets the instruction scheduler in the low level optimizer determine exactly how far in advance the indexed stream should be touched, as shown in Example 8.

```
__protected_stream_set(FORWARD, a, 1);
__protected_steam_count(N/16, 1);
__eieio( );
__protected_stream_go( );
For (i=0; i<N; i++) {
    __dcbt( b[ a[i+ahead] ] );
    ... = ...b [ a[i] ];
}
```

Example 8

Prefetching Indexed Stream B

When the indexed prefetching is complete for the stream, the process moves to block 812. In this step, a redundant prefetch elimination process is performed in order to eliminate redundant prefetches based on the information gathered during blocks 402, 404, 406, 410, 412, 414 and 416 in FIG. 4.

Returning to block 808, if the stream type is not a indexed stream the process moves to block 810. A determination is made as to whether the stream type is a strided stream (block 810). If so, the process continues to block 820. Strided stream prefetching is performed (block 820). Strided stream prefetching is similar to indexed stream prefetching, in that a pseudo cache line touch is inserted in the loop body. As shown in Example 9, node_t is a big structure with its size being bigger than L1 cache line. Since root points to an array of node_t, the compiler can determine the constant stride and dcbt can be inserted ahead of time.

```
typedef struct node
{
    long number;
    char *ident;
    struct node *pred, *child, *sibling, *sibling_prev;
    long depth;
    long orientation;
    struct arc *basic_arc;
    struct arc *firstout, *firstin;
    cost_t potential;
    flow_t flow;
    size_t mark;
    long time;
} node_t;
for ( node = root, stop = net->stop_nodes; node <
(node_t*)stop; node++ ) {
        __dcbt( node + sizeof(node_t)* ahead);
        node->mark = node->depth * node->umber;
}
```

Example 9

Pseudo Cache Line Touch Inserted into a Strided Stream

For irregular stride stream, extended dynamic profile information gathered from the runtime hardware performance counters can guide the compiler to place touch instructions ahead for irregular data accesses which incur data misses. The low level analysis may further determine that prefetches are redundant, either because they are not sufficiently ahead of the load or because the address is covered by a previous prefetch instruction. In Example 10, a pointer-chasing code usually has irregular behaviors. But in some cases, it shows regular stride pattern at run time. Based on the dynamic profile information, a touch instruction can be inserted to do prefetching.

```
struct node {
    struct node * next;
    Element element1, element2, .....,elementN;
}
struct node * first_node, *current_node;
....
while ( current_node != NULL) {
        /* touch insertion */
    ___dcbt( current_node + stride );
        /* code to process current node */
    ...
        /* load next node */
    current_node = current_node->next;
}
```

Example 10

Irregular Stride Stream Touching

When the strided prefetching is complete for the stream, the process moves to block 812. In this step, a redundant prefetch elimination process is performed in order to eliminate redundant prefetches based on the information gathered during blocks 402, 404, 406, 410, 412, 414 and 416 in FIG. 4. Returning to block 810, if the stream type is not a stride stream the process returns to block 802 and the stream list is updated with an error indicating the stream type as undefined.

In summary, the present invention provides a mechanism for minimizing effective memory latency without unnecessary cost through fine-grained software-directed data prefetching using integrated high-level and low-level code analysis and optimizations. The mechanism identifies and classifies streams based on reuse analysis and dependence analysis. The mechanism makes use of the information from high-level loop transformations, data remapping, and work data-set analysis to identify which data is most likely to incur a cache miss. The mechanism exploits effective hardware prefetching through high-level loop transformations, including locality and reuse analysis, to determine the proper number of streams. The mechanism exploits effective data prefetching on different types of streams, based on compiler static analysis and dynamic profiling information, in order to eliminate redundant prefetching and avoid cache pollution. The mechanism uses high-level transformations with integrated lower level cost analysis in the instruction scheduler to schedule prefetch instructions effectively.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for minimizing effective memory latency, the apparatus comprising:
a bus;
a main memory connected to the bus, wherein the main memory having computer executable program code stored therein;
a processor connected to the bus, wherein the processor executes the computer executable program code to direct the apparatus to:
analyze a portion of code that contains one or more loops, to form a loop table;
identify at least one candidate loop within the one or more loops of the loop table for prefetch efficiency optimization;
insert prefetch control instructions and directives to optimize the at least one candidate loop, wherein the prefetch control instructions and directives are inserted at selected locations in an instruction stream, in advance of data use, according to a stream type, and wherein a stream is a sequence of addresses which depend upon an induction variable of the at least one candidate loop;
determine whether pipelining is available;
responsive to a determination that pipelining is not available, adjust prefetch addresses in the prefetch control instructions forward to fetch cache lines in advance of data use;
gather memory references of the at least one loop; and
perform at least one of data dependency analysis and reuse analysis on the at least one candidate loop to identify unique streams within the at least one candidate loop.

2. The apparatus of claim 1, the processor executes the computer executable program code to analyze the portion of code further directs the apparatus to:
include at least one of inter-loop analysis and work data set analysis.

3. The apparatus of claim 1, wherein the processor further executes the computer executable program code to direct the apparatus to:
perform at least one of data dependency analysis and reuse analysis on the at least one candidate loop.

4. The apparatus of claim 1, wherein the processor executes the computer executable program code of the at least one candidate loop to generate one or more streams of instructions, further directs the apparatus to:
classify the one or more streams of instructions for a given candidate loop within the at least one candidate loop.

5. The apparatus of claim 1, wherein the processor executes the computer executable program code to direct the apparatus to identify at least one candidate loop is based on static and dynamic profile information, wherein the static and dynamic profile information is based upon frequency of candidate loop execution and data size of the candidate loop.

6. The apparatus of claim 1, wherein the processor executes the computer executable program code to direct the apparatus to classify the one or more streams of instructions classifies the streams into at least one of a load stream, a store stream, an indexed stream and a strided stream.

7. The apparatus of claim 4, wherein the processor executes the computer executable program code to direct the apparatus to:
  identify at least one stream within the one or more stream of instructions, wherein the at least one stream is identified by performing at least one of guided information high-level loop optimizations, work data-set analysis and runtime hardware performance.

8. The apparatus of claim 7, wherein the processor executes the computer executable program code to direct the apparatus to:
  mark the profitable stream as protected; and
  estimate a prefetching distance for the profitable stream.

9. The apparatus of claim 1, wherein the processor further executes the computer executable program code to direct the apparatus to:
  eliminate redundant prefetch control instructions;
  perform low-level optimizations; and
  adjust the prefetch control instructions.

10. The apparatus of claim 9, wherein adjustments of the prefetch control instructions are based on the inserted directives and the low-level optimizations.

11. A computer program product for minimizing effective memory latency, the computer program product comprising:
  a non-transitory computer recordable-type media having computer executable instructions stored thereon, the computer executable instructions comprising:
  computer executable instructions for analyzing a portion of code that contains one or more loops to form a loop table;
  computer executable instructions for identifying at least one candidate loop within the one or more loops of the loop table for prefetch efficiency optimization; and
  computer executable instructions for inserting prefetch control instructions and directives to optimize the at least one candidate loop, wherein the prefetch control instructions and directives are inserted at selected locations in an instruction stream, in advance of data use, according to a stream type, and wherein a stream is a sequence of addresses which depend upon an induction variable of the at least one candidate loop;
  computer executable instructions for determining whether pipelining is available;
  computer executable instructions responsive to a determination that pipelining is not available, for adjusting prefetch addresses in the prefetch control instructions forward to fetch cache lines in advance of data use;
  computer executable instructions for gathering memory references of the at least one loop; and
  computer executable instructions for performing at least one of data dependency analysis and reuse analysis on the at least one candidate loop to identify unique streams within the at least one candidate loop.

12. The computer program product of claim 11, wherein the computer executable instructions for analyzing the portion of code further includes computer executable instructions for at least one of inter-loop analysis and work data set analysis.

13. The computer program product of claim 11, further comprising:
  computer executable instructions for performing at least one of data dependency analysis and reuse analysis on the at least one candidate loop.

14. The computer program product of claim 11, wherein the computer executable instructions for the at least one candidate loop generates one or more streams of instructions, further comprises:
  computer executable instructions for classifying the one or more streams of instructions for a given candidate loop within the at least one candidate loop.

15. The computer program product of claim 11, wherein the computer executable instructions for identifying at least one candidate loop is based on static and dynamic profile information, wherein the static and dynamic profile information is based upon frequency of candidate loop execution and data size of the candidate loop.

16. The computer program product of claim 11, wherein the computer executable instructions for classifying the one or more streams of instructions classifies the streams into at least one of a load stream, a store stream, an indexed stream and a strided stream.

17. The computer program product of claim 14, further comprising:
  computer executable instructions for identifying at least one stream within the one or more stream of instructions to form a profitable stream, wherein the at least one stream is identified by performing at least one of guided information high-level loop optimizations, work data-set analysis and runtime hardware performance.

18. The computer program product of claim 17, further comprising:
  computer executable instructions for marking the profitable stream as protected; and
  computer executable instructions for estimating a prefetching distance for the profitable stream.

19. The computer program product of claim 11, further comprising:
  computer executable instructions for eliminating redundant prefetch control instructions;
  computer executable instructions for performing low-level optimizations; and
  computer executable instructions for adjusting the prefetch control instructions.

20. The computer program product of claim 19, wherein the computer executable instructions for adjusting the prefetch control instructions are based on the inserted directives and the low-level optimizations.

* * * * *